United States Patent
Kawai

[11] Patent Number: 6,164,603
[45] Date of Patent: Dec. 26, 2000

[54] BASE MOUNTING STRUCTURE

[75] Inventor: Tsutomu Kawai, Nagoya, Japan

[73] Assignee: Kitagawa Industries Co., Ltd, Nagoya, Japan

[21] Appl. No.: 09/172,404

[22] Filed: Oct. 14, 1998

[30] Foreign Application Priority Data

Oct. 16, 1997 [JP] Japan .................................. 9-283697

[51] Int. Cl.⁷ ..................................................... F16L 3/00
[52] U.S. Cl. ........................... 248/73; 248/74.3; 24/543; 24/297
[58] Field of Search ........................ 248/73, 74.3, 74.2, 248/74.1, 74.4, 71, 69, 220.31, 220.41, 220.42, 220.43; 24/543, 297

[56] References Cited

U.S. PATENT DOCUMENTS

| | | | |
|---|---|---|---|
| 2,342,958 | 2/1944 | Morehouse | 248/68.1 |
| 2,972,461 | 2/1961 | Balbach et al. | 248/68.1 |
| 3,363,865 | 1/1968 | Metsker | 248/71 |
| 4,325,526 | 4/1982 | Kitagawa | 248/73 |
| 4,441,680 | 4/1984 | Rivkin et al. | 248/220.4 |
| 4,457,482 | 7/1984 | Kitagawa | 248/74.3 |
| 4,589,794 | 5/1986 | Sugiura et al. | 403/187 |
| 4,609,171 | 9/1986 | Matsui | 248/74.3 |
| 4,629,356 | 12/1986 | Hayashi | 403/408.1 |
| 4,669,688 | 6/1987 | Itoh et al. | 248/74.2 |
| 4,799,641 | 1/1989 | Koreski | 248/68.1 |
| 4,815,175 | 3/1989 | Kasai | 24/543 X |
| 4,901,204 | 2/1990 | Hayashi | 361/417 |
| 5,820,048 | 10/1998 | Shereyk et al. | 248/68.1 |
| 5,852,854 | 12/1998 | Pierrot et al. | 24/297 |

Primary Examiner—Ramon O. Ramirez
Assistant Examiner—Gwendolyn Baxter
Attorney, Agent, or Firm—Davis and Bujold

[57] ABSTRACT

A base mounting structure which can easily be mounted in a minimal operation space with a minimal protrusion from the underside of a board. The base mounting structure is provided with first and second mounting portions 17 and 27 protruding downwardly and outwardly from opposite ends 14 and 24 of a base 10 having a central hinge portion 11 and resilient engaging members 30*a* and 30*b* having engaging portions 33*a* and 33*b* protruding outwardly from lower ends thereof. When the first and second mounting portions 17 and 27 and the engaging members 30*a* and 30*b* are inserted into holes 51, 52 and 53 in a board 50, the base 10 is firmly mounted to the board 50. An upper portion of the base 10 is provided with an openable/closable cable holding portion 40 and a locking portion 42 for locking the cable holding portion 40.

4 Claims, 6 Drawing Sheets

BASE MOUNTING STRUCTURE

BACKGROUND OF THE INVENTION (i) Field of the Invention

The present invention relates to a base mounting structure for mounting a base to a board, such as a base panel or a chassis of an electronic appliance (hereinafter "a board").

(ii) Description of the Related Art

In a conventional method of mounting a cable holder or another base to such a board, the base is slid or rotated to mount it in a mounting hole of the board. If the base is slid or rotated, space is required around the mounting area on the board, which therefore wastes space. As another mounting method, a snap-fitting system is used in which a snap member is inserted into a through hole, and a locking piece is pushed outward using elastic deformation of the snap member, so that a base is mounted to the board.

In the snap-fitting method, since the snap member protrudes an excessive amount from the rear of the board, the use of a space on the rear of the board may be restricted.

SUMMARY OF THE INVENTION

Wherefore, an object of the present invention is to provide a base mounting structure in which a base can be easily mounted and an operation space for mounting the base can be minimized.

Another object of the present invention is to provide a base mounting structure in which the amount of protrusion of an engaging member from the rear of a board can be minimized.

According to the invention there is provided a base mounting structure comprising: an elongate base; a first mounting portion protruding downward from one end of the base longitudinally of an underside of the base, and extending outwardly, which can be engaged in a first hole in a board; a second fixing portion protruding downward from an opposite end of the base longitudinally of the underside of the base, and extending outwardly, which can be engaged in a second hole in the board; a hinge portion disposed between one end and the opposite end longitudinally of said base, and a resilient engaging member extending downwardly from the base in the vicinity of the hinge portion to engage a third hole in the board to hold the base in engagement with the board.

BRIEF DESCRIPTION OF THE DRAWINGS

The invention will now be described, by way of example, with reference to the accompanying drawings in which.

DETAILED DESCRIPTION OF THE PREFERRED EMBODIMENT

Preferred embodiments of the present invention will be described with reference to the accompanying drawings.

Figure 1:
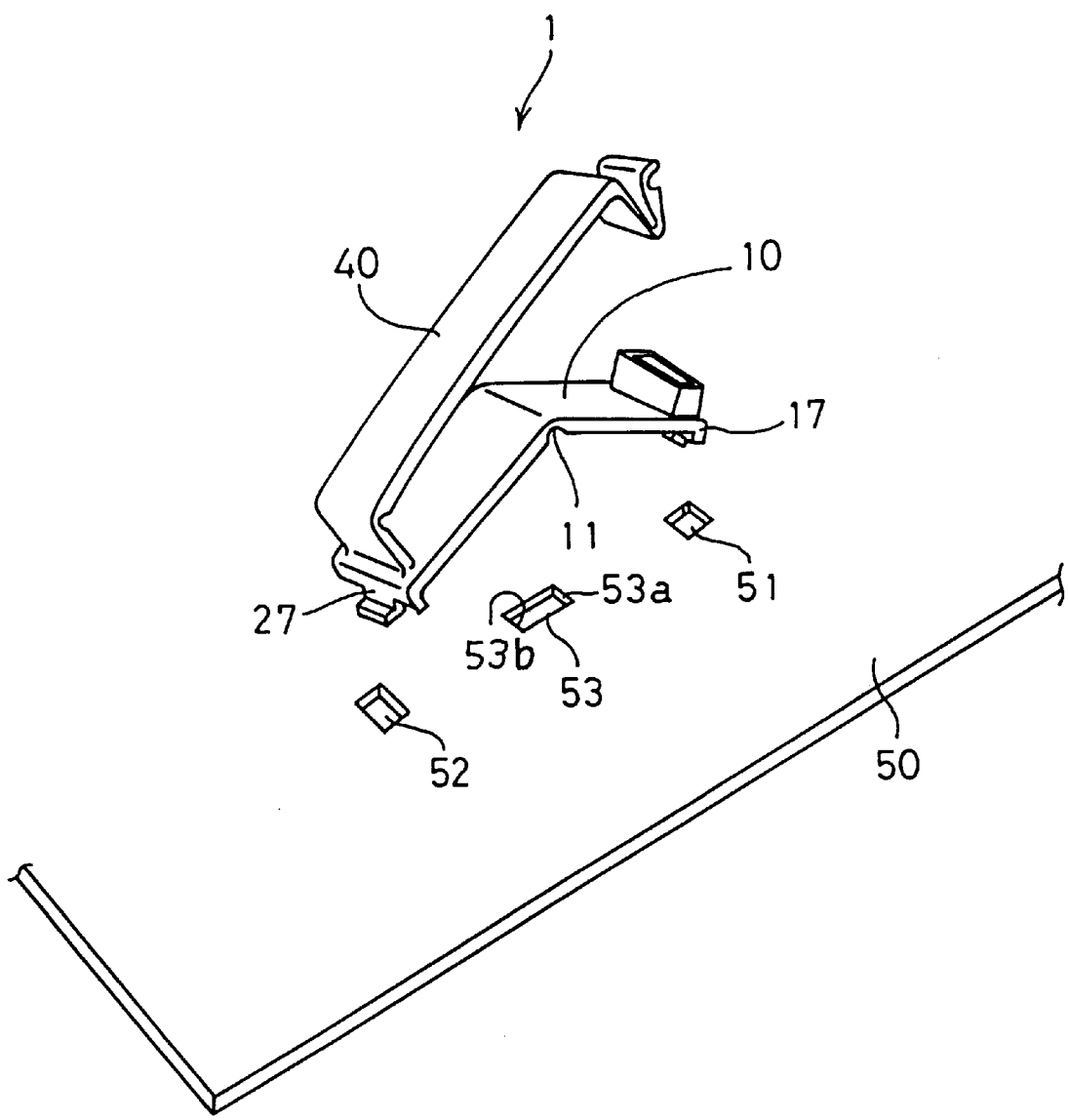
FIG. 1 is a perspective view showing a main part of a base mounting structure according to a first embodiment of the present invention.
Figure 2A:
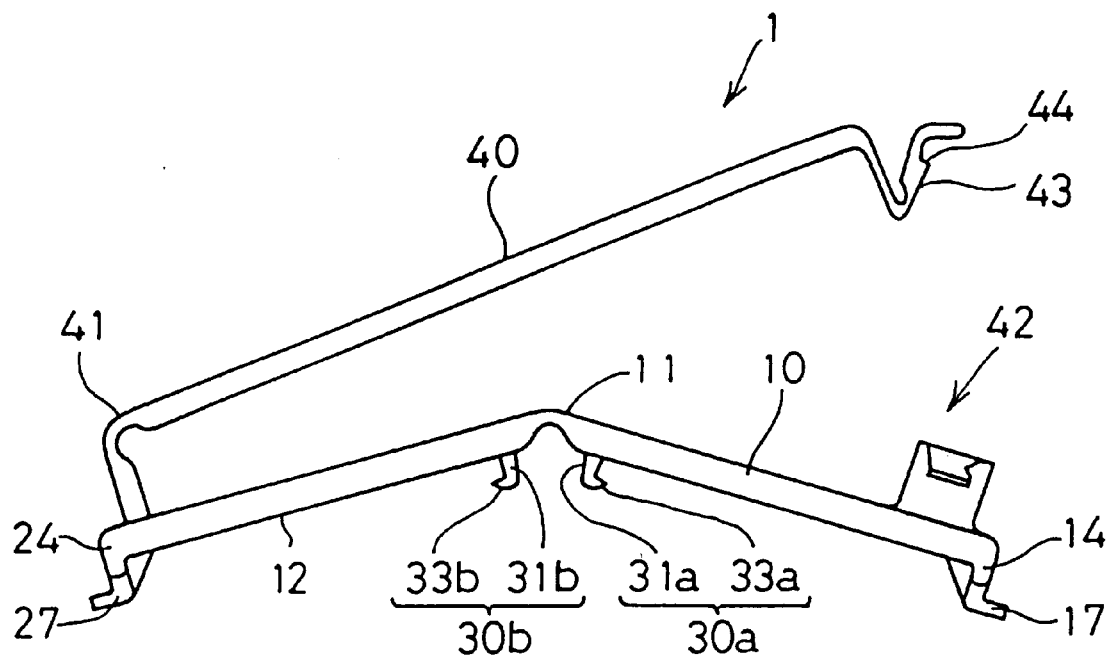
FIG. 2A is a front view of the main part of the base mounting structure of the first embodiment.
Figure 2B:
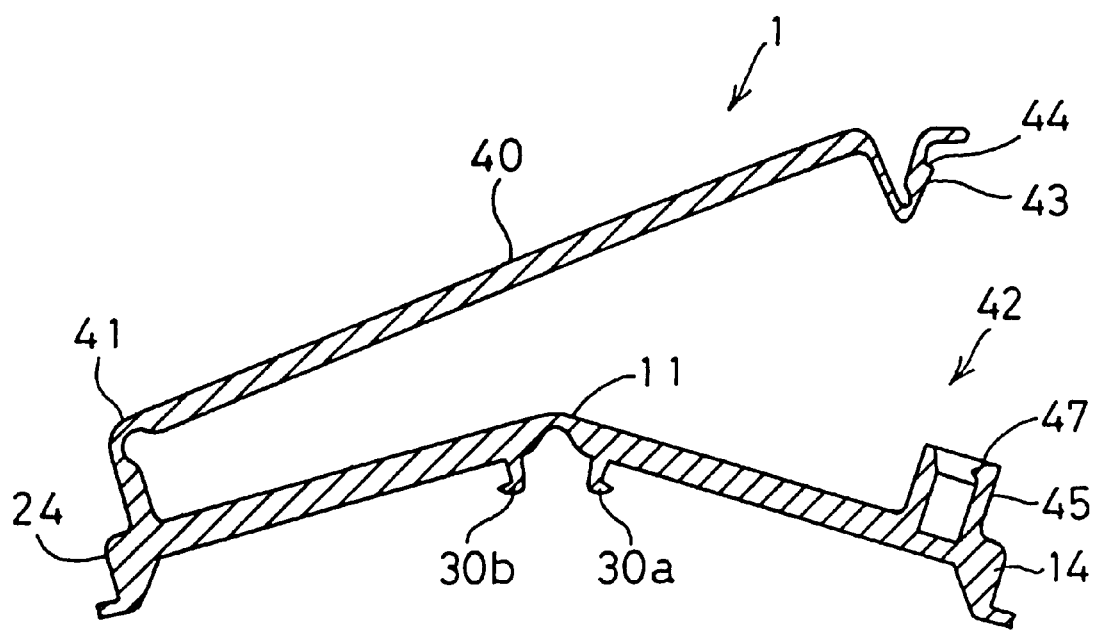
FIG. 2B is a center sectional view as seen from the front.

As shown in FIGS. 1, 2A and 2B, a base mounting structure 1 is formed of a plastic having resilience, and provided with a first mounting portion 17, a second mounting portion 27, a hinge portion 11, and engaging members 30a and 30b.

The first mounting portion 17 protrudes downward from an end 14 of an underside 12 longitudinally of a base 10, and extends outward. The first mounting portion 17 can be fitted in a first opening 51 in a board 50. The second mounting portion 27 protrudes downward from the other end 24 of the underside 12 longitudinally of the base 10, and extends outward away from the mounting portion 17. The second mounting portion 27 can be fitted in a second opening 52 in the board 50. The hinge portion 11 is disposed substantially at the center of the base 10, between the ends 14 and 24, in the longitudinal direction of the base 10. In a normal state, the hinge portion 11 is hinged upward and positioned above the ends 14 and 24 of the base 10.

The engaging members 30a and 30b are provided with two elastic support legs 31a and 31b protruding downward from the underside 12 of the base 10 in the vicinity of the hinge portion 11 on opposite sides thereof, and have engaging portions 33a and 33b protruding outwardly from tip ends of the support legs 31a and 31b away from each other in order to engage outer edges 53a and 53b of a third opening 53 in the board 50.

In an upper portion of the base 10, a cable holding portion 40 openable/closable via a hinge 41 extends from the end 24 of the base 10, and a locking portion 42 is formed on the end 14 of the base 10 for locking the cable holding portion 40 in a closed state.

A free end of the cable holding portion 40 is provided with an resilient curved portion 43 curved substantially in a V-shape, and a latch flange 44 is formed in a tip end of the curved portion 43.

The locking portion 42 is provided with a substantially box-shaped containing portion 45 for receiving the curved portion 43, having a detent 47 formed on an inner upper portion of an outer side wall thereof.

The flange 44 of the curved portion 43 engages the detent 47.

Figure 3A:
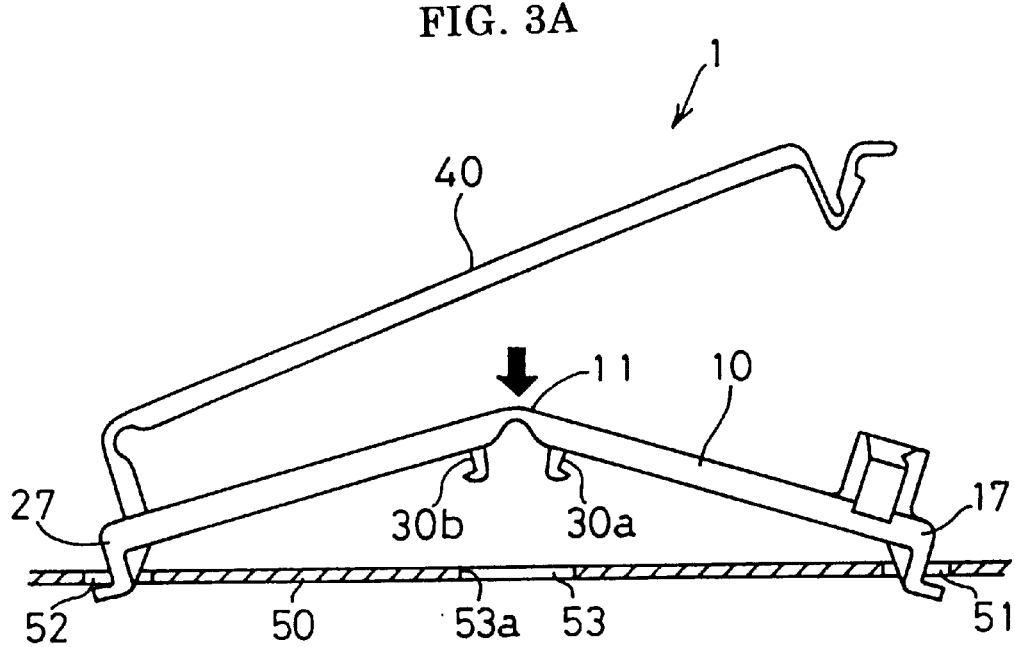
FIGS. 3A, 3B and 3C are views showing the mounting steps of the base mounting structure of the first embodiment.

As shown in FIG. 3A, the first mounting portion 17 of the base 10 is inserted into the first opening 51 of the board 50, and the second mounting portion 27 is inserted into the second opening 52 of the board 50.

Figure 3B:
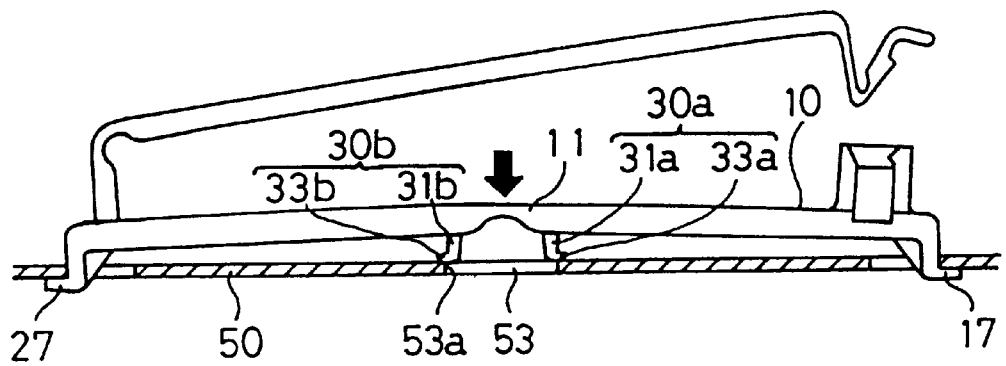
Figure 3C:
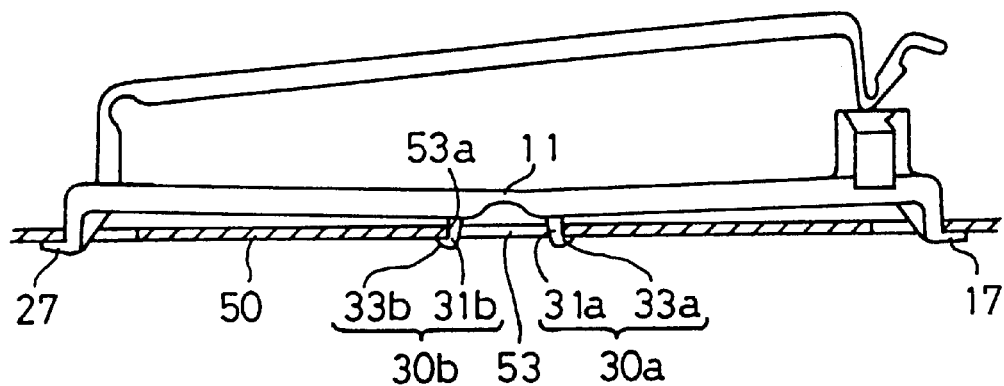

Subsequently, the hinge portion 11 of the base 10 is hinged downward, as shown by an arrow, to the position shown in FIG. 3B, so that the base 10 is placed substantially horizontally and parallel with the board 50. In this position the first and second mounting portions 17 and 27 abut the underside of the board 50, and the engaging portions 33a and 33b of the engaging members 30a and 30b abut upper corners of the third opening 53 of the board 50. Subsequently, as shown in FIG. 3C, when the hinge portion 11 is further hinged downward, the engaging portions 33a and 33b are pushed through the third opening 53. In this case, the support legs 31a and 31b are first resiliently deformed inward to come close to each other when pushed into the third opening 53, and then expand outward after passing through the third opening 53. The protruding engaging portions 33a and 33b are thus engaged with the lower edges 53*a* and 53*b* of the opening 53, and prevented from disengaging from the board 50. Consequently, the base 10 is firmly mounted to the board 50 by the first and second mounting portions 17 and 27 and the engaging members 30*a* and 30*b*.

To facilitate passage through the opening 53 the outwardly extending engaging portions 33*a* and 33*b* have chamfered outer undersurfaces which engage the edges 53*a* and 53*b*.

Because the hinge portion 11 is only expanded, sliding, rotating or another specific mounting operation is unnecessary. Furthermore, only a minimum operation space for the area of the base 10 is necessary. Accordingly, the base mounting structure 1 is effective for operation in a small space.

Since the hinge portion 11 is provided substantially in the center of the base 10, by pushing downward the substantially center portion of the base 10 only, the engaging members 30*a* and 30*b* can be engaged, and the balance of forces exerted to the first and second mounting portions 17 and 27 formed on the ends 14 and 24 of the base 10 is enhanced.

Figure 4:
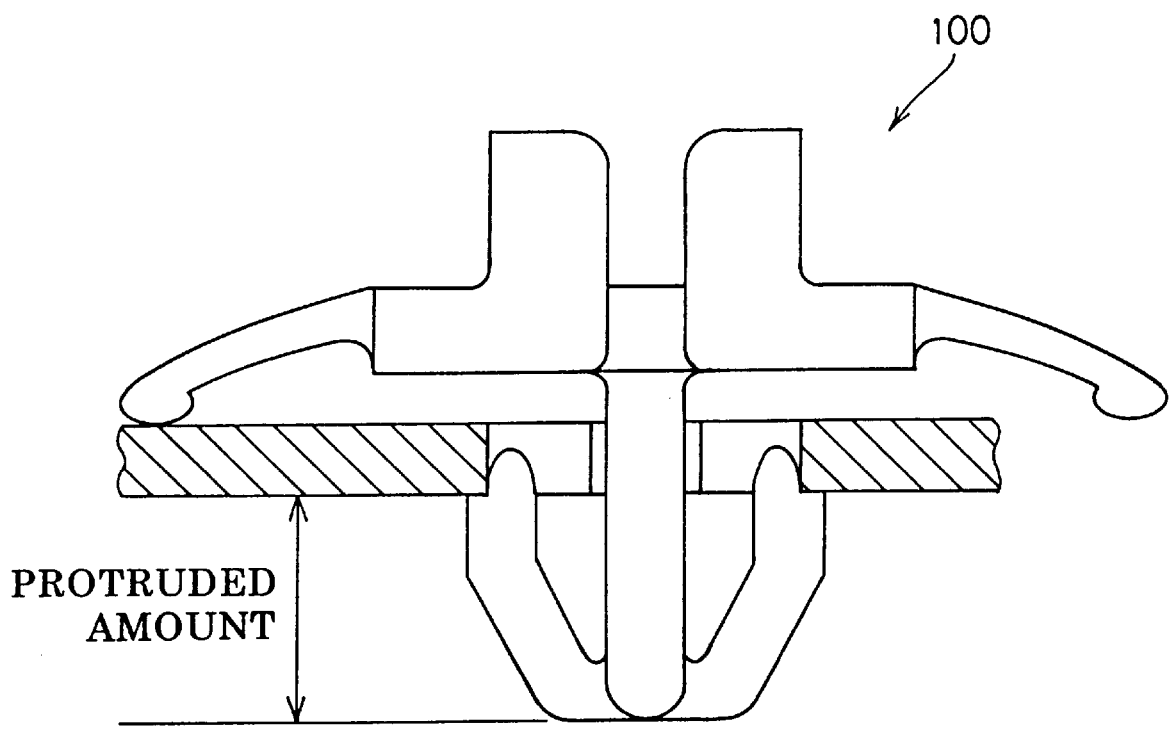
FIG. 4 is a view showing a conventional prior art snap mounting.

Additionally, as compared with a conventional snap type base mounting structure 100 shown in FIG. 4, the extent of any protrusion of the engaging members 30*a* and 30*b* from the underside of the board can be minimized because the engaging portions 33*a* of the 33*b* protrude transversely from the support legs 31*a* and 31*b*, respectively.

Figure 5:
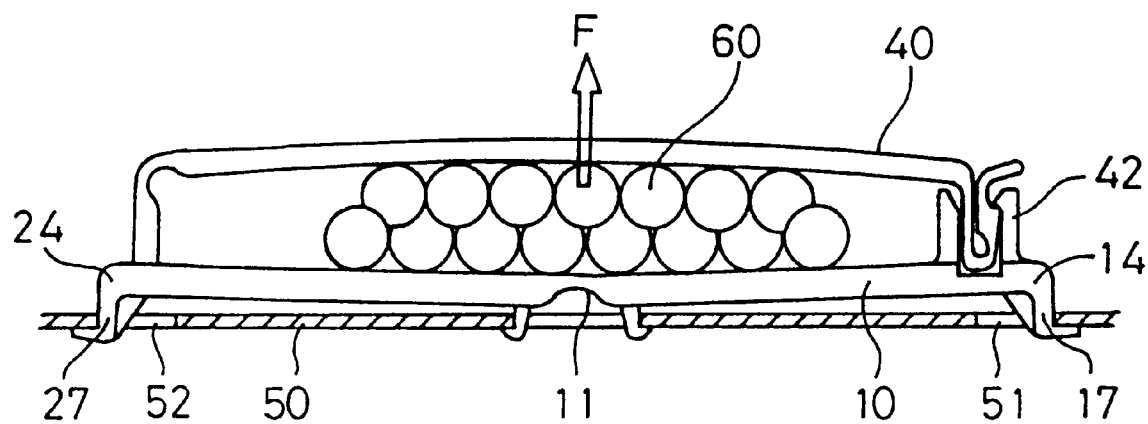
FIG. 5 is a view showing the main part of the base mounting structure of the first embodiment when mounted.

After the base 10 is mounted on the board 50, as shown in FIG. 5, cables 60 are placed in the cable holding portion 40 when in an opened state, and the cable holding portion 40 is then closed and locked by the locking portion 42.

In this case, since the weight of the cables 60 applied to the hinge portion 11 of the base 10, a force is exerted in a direction in which the hinge portion 11 is pushed toward the board 50. As a result, a force is further applied to the portions fitted in the first and second openings 51 and 52, i.e., the outwardly extending portions of the first and second mounting portions 17 and 27 on the ends 14 and 24 in a direction in which the peripheral edges of the first and second openings 51 and 52 are pushed up from the underside. Thereby, the base 10 is more firmly mounted on the board 50.

Additionally, if an external force F is applied to portion 40 by the cables 60, as shown by an arrow in FIG. 5, most of the external force F is received by the first and second mounting portions 17 and 27. Therefore, even if a large external force F is applied, the base 10 is prevented from disengagement from the board 50.

In the embodiment described above, the outwardly extended portions of the first and second mounting portions 17 and 27 of the base 10 are short so that the first and second mounting portions 17 and 27 of the base 10 can easily be inserted into the first and second openings 51 and 52 of the board 50. Alternatively, the opening 51 or 52 of the board 50 may be enlarged in the longitudinal direction of the board 50 also so that the first and second mounting portions 17 and 27 can be easily inserted into the openings 51 and 52.

Figure 6A:
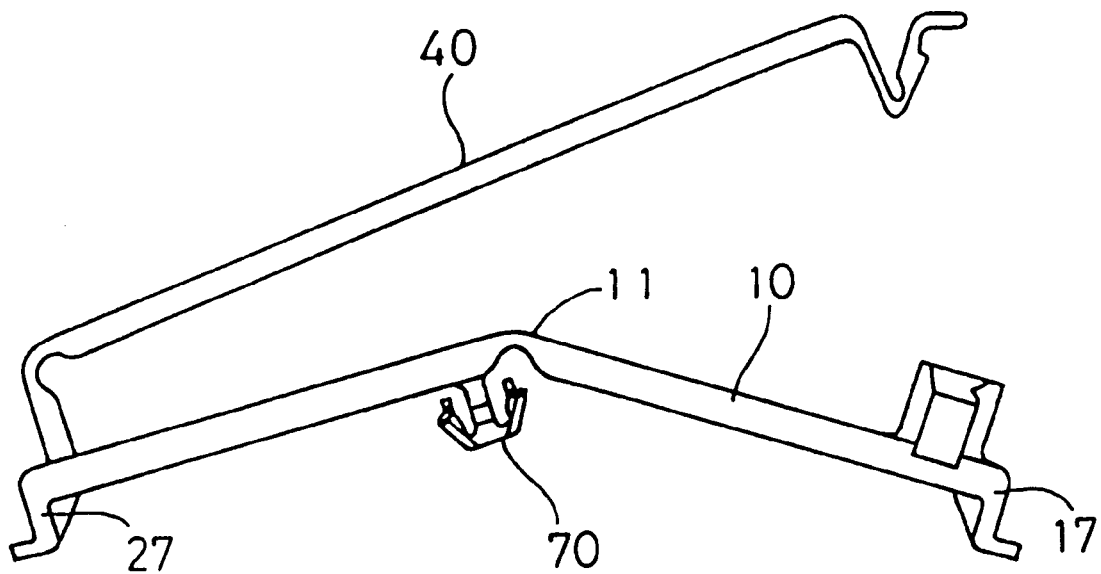
FIGS. 6A and 6B are views showing a main part of a base mounting structure according to a second embodiment of the present invention.

Also in the embodiment, the engaging members 30*a* and 30*b* are provided with the engaging portions 33*a* and 33*b* and the support legs 31*a* and 31*b* protruding downward from the underside of the base 10. In the second embodiment, as shown in FIG. 6A, a snap type engaging member 70 may be provided with one support leg protruding downward from the underside of the base 10. In this case, however, the engaging member 70 is reduced in width when passing through a hole in the board 50, and returns to its original state after passing through the hole.

Figure 6B:
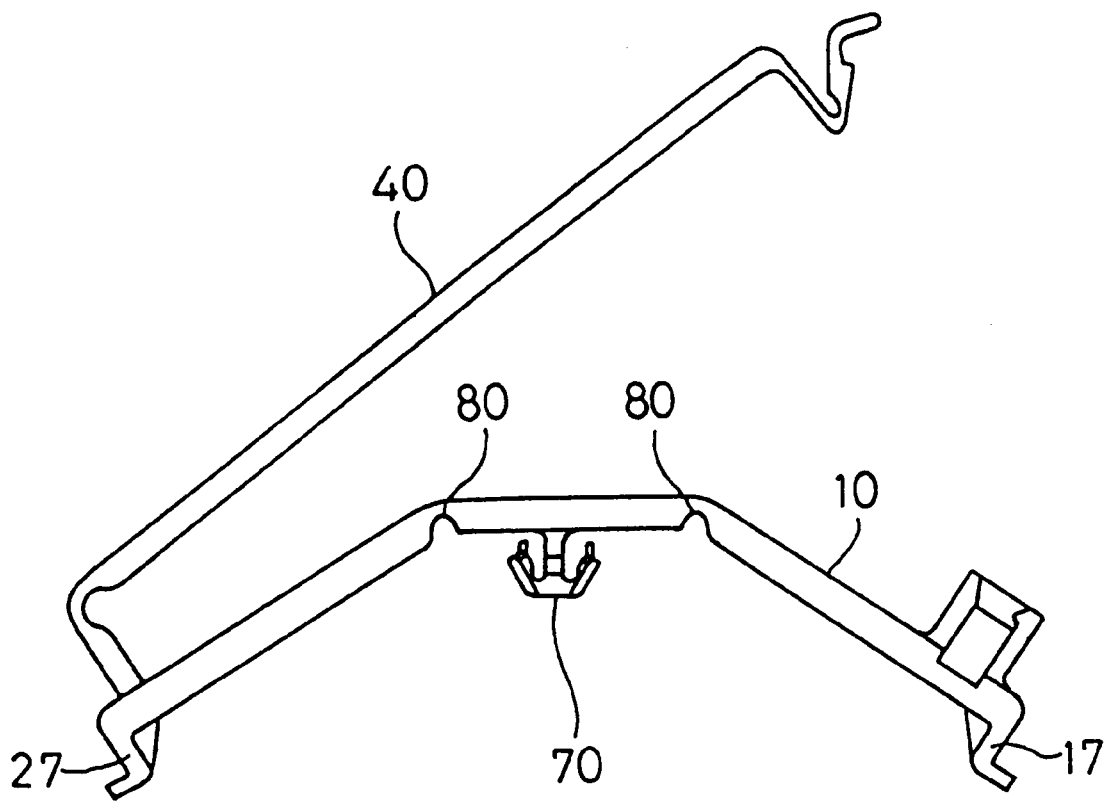

Additionally, instead of the single hinge portion 11 of the first embodiment and, as shown in FIG. 6B, two hinge portions 80 may be provided, and the snap type engaging member 70 may be formed between these hinge portions 80.

Furthermore, besides the cable holding portion 40 disposed above the base 10, the present invention may be applied to a guard rail for a board, a circular clamp, and the like.

What is claimed is:

1. A base mounting structure comprising:

an elongate base;

a first mounting portion protruding downward from one end of the base longitudinally of an underside of the base and extending outwardly, adapted to engaged in a first hole in a board;

a second mounting portion protruding downward from an opposite end of the base longitudinally of the underside of the base and extending outwardly, adapted to engaged in a second hole in the board;

a hinge portion disposed between the one end and the opposite end longitudinally of said base; and a resilient engaging member extending downwardly from the base in the vicinity of the hinge portion to engage a third hole in the board to hold the base in engagement with the board.

2. The base mounting structure according to claim 1 wherein said hinge portion is disposed substantially on a central portion longitudinally of said base.

3. The base mounting structure according to claim 1 which further comprises, in an upper portion of said base, an openable/closable cable holding portion; and a locking portion for holding the cable holding portion in a closed state.

4. The base mounting structure according to claim 1 wherein said resilient engaging member comprises:

two support legs opposed to each other and which protrude downward from the underside of said base; and engaging portions which protrude outwardly from tip ends of said support legs, which can be engaged with peripheral edges of the third hole.

* * * * *